US012214981B2

(12) United States Patent
Puccioni et al.

(10) Patent No.: US 12,214,981 B2
(45) Date of Patent: Feb. 4, 2025

(54) METHOD AND PLANT FOR PRODUCING LOGS OF THIN PRODUCTS

(71) Applicant: ITALIA TECHNOLOGY ALLIANCE S.R.L., Bologna (IT)

(72) Inventors: Giovanni Puccioni, Capannori (IT); Francesco Vergentini, Pieve a Nievole (IT)

(73) Assignee: ITALIA TECHNOLOGY ALLIANCE S.R.L., Bologna (IT)

( * ) Notice: Subject to any disclaimer, the term of this patent is extended or adjusted under 35 U.S.C. 154(b) by 1340 days.

(21) Appl. No.: 16/753,425

(22) PCT Filed: Oct. 4, 2018

(86) PCT No.: PCT/IB2018/057728
§ 371 (c)(1),
(2) Date: Apr. 3, 2020

(87) PCT Pub. No.: WO2019/069272
PCT Pub. Date: Apr. 11, 2019

(65) Prior Publication Data
US 2020/0247634 A1    Aug. 6, 2020

(30) Foreign Application Priority Data
Oct. 6, 2017 (IT) ........................ 102017000112283

(51) Int. Cl.
*B65H 18/08* (2006.01)
*B65H 26/02* (2006.01)
(Continued)

(52) U.S. Cl.
CPC .............. *B65H 18/08* (2013.01); *B65H 26/02* (2013.01); *B65H 43/04* (2013.01);
(Continued)

(58) Field of Classification Search
USPC ....................................................... 700/116
See application file for complete search history.

(56) References Cited

U.S. PATENT DOCUMENTS 2,366,999 A * 1/1945 Campbell .............. B65H 35/02
242/571.1
6,155,025 A * 12/2000 Komiya .................... B65B 5/10
53/154
(Continued)

FOREIGN PATENT DOCUMENTS

DE    2008 003014 U1    6/2008
DE    2009 016379 U1    4/2010
(Continued)

*Primary Examiner* — Emilio J Saavedra
(74) *Attorney, Agent, or Firm* — McGlew and Tuttle, P.C.

(57) ABSTRACT

Method for producing logs (B1, B2) of continuous thin products, or web products, in optimized manner by tracking defects in the surface and/or in the thickness detected on the products, comprising •—a step of continuously winding a thin product (T) into logs (B1, B2) on a winding machine, in order to produce at least one primary log, •—a step of identifying any defects in the surface and/or the thickness of said continuous thin product, •—a step of storing in a database system (31), outside the primary log, information related to said defects comprising at least the position of said defects with respect to a reference system associated with the primary log, •—a step of assigning a primary ID code to said primary log, •—a step of marking said primary log with said primary code, •—a step of associating, in said database system (31), information on said defects with the primary ID code of the primary log, so that, in said database, to a given primary ID code information are associated related to defects in the surface and/or the thickness of the respective primary log, that can be identified based on their position on the primary log, •—a step of using said information on the defects of the primary log, stored in the database system (31), in order to optimize at least one subsequent processing of the product wound into the respective primary log, said use providing for recognizing the primary code of the primary log being processed and the processing of the product based on the information on the surface defects associated to the primary log.

20 Claims, 2 Drawing Sheets

(51) Int. Cl.
*B65H 43/04* (2006.01)
*G05B 19/418* (2006.01)
*B65H 18/00* (2006.01)
*B65H 18/02* (2006.01)

(52) U.S. Cl.
CPC .......... *G05B 19/4183* (2013.01); *B65H 18/00* (2013.01); *B65H 18/02* (2013.01); *B65H 2301/4148* (2013.01); *B65H 2553/52* (2013.01); *B65H 2557/62* (2013.01); *G05B 2219/36284* (2013.01); *G05B 2219/49302* (2013.01)

(56) References Cited

U.S. PATENT DOCUMENTS

| | | | | |
|---|---|---|---|---|
| 2002/0079400 | A1* | 6/2002 | Fujiwara | B65H 18/10 242/530.4 |
| 2009/0218435 | A1* | 9/2009 | Morgan | B65H 75/30 242/610.6 |
| 2013/0215448 | A1* | 8/2013 | Gentile | B65H 26/02 358/1.13 |
| 2015/0292163 | A1* | 10/2015 | Bomstad | D21H 27/005 700/125 |
| 2015/0346106 | A1 | 12/2015 | Eder et al. | |

FOREIGN PATENT DOCUMENTS

| | | |
|---|---|---|
| DE | 10 2009 029082 A1 | 3/2011 |
| EP | 1 174 275 A1 | 1/2002 |
| EP | 1 205 413 A2 | 5/2002 |
| WO | 2008/010239 A1 | 1/2008 |

* cited by examiner

METHOD AND PLANT FOR PRODUCING LOGS OF THIN PRODUCTS

TECHNICAL FIELD

The present invention relates to the production of continuous thin products, or web products, to be wound in a log, such as paper products, paper, tissue paper, non-woven fabrics, films, multi-material products or the like.

In particular, the present invention relates to a method for producing logs of continuous thin products, or web products, in optimized manner by tracking defects in the surface and/or in the thickness detected on the products.

Moreover, an object of the invention is a plant for producing logs of continuous thin products, or web products, in optimized manner by tracking defects in the surface and/or in the thickness detected on the products.

STATE OF THE ART

In many industrial fields it is necessary to transform logs of web material, the so-called master rolls, produced for example by winding around a cylindrical core, into rolls of different size; to this end, a method is used providing for unwinding the master rolls and rewinding them, through the so-called rewinding machines, into rolls having different dimensional features. The smaller final logs are used as semi-finished products to feed lines for the manufacturing of further products.

Some plants produce only master rolls that are then sent to the clients for subsequent converting, for example for dividing them into smaller logs by means of rewinding machines for subsequent processing; some plants can also produce also the smaller logs, that are then sent to the final client for producing the finished products.

Rewinding machines usually comprise a station where the support cores for the secondary logs are produced, providing for example for an initial cylindrical body the is longitudinally cut (i.e. in the axial direction of the cylindrical body) into a number of cylindrical cores equal to the number of secondary logs to be produced, wherein each of the core has transverse width (i.e. the length along the axis thereof) equal to the width of the secondary log it will support.

Moreover, the rewinding machines comprise an area where the master roll to be unwound is arranged, and an area, in front thereof, where the support cores, produced in the core preparation station, are arranged aligned and adjacent. The tail edge of the master roll is fixed to the longitudinal set of the coaxial and contiguous support cores. The set of the cores is driven in rotation together with the master roll, so that the web product is unwound therefrom in the direction of the cores.

A series of cutting blades, whose number is generally equal to the number of cores minus one, are arranged between the master roll and the support cores. The blades are arranged in a longitudinal position corresponding to the area where the cores are separated, so that, whilst the master roll is unwound, the web product is cut in machine direction, thus producing webs of width equal to the corresponding cores on which they are wound.

The number and the position of the cores (and therefore the number and the transverse width or axial length of the cores) can be varied based on the production needs. From a master roll, a variable number of secondary logs of different transverse width can be therefore produced.

Paper labels are fixed on the outer surface of the secondary logs, with ID codes useful for storing the logs and delivering to the client.

A production plant similar to that described herein is disclosed, for example, in the patent document WO2008/010239.

When producing the web product, defects in the surface or the width can occur, as well as other defects. The product with these defects is wound into the master roll. In certain cases, it is possible to verify the surface defects when the master roll is unwound for rewinding the secondary logs. When these defects are detected, the production plant is stopped, the part of web product with defects is cut, the product is fixed again to the secondary logs, and the rewinding starts again; this results in down times and in a reduction of the overall productivity of the plant.

A further problem in the production of secondary logs is the management thereof once they have been produced. The presence of secondary logs of different dimensions and the contemporaneous production for more clients can create mess in assigning lots of reels to be sent to the warehouse or to the final client, and there is the risk of making mistakes in the packages of reels to be sent to the client. This can also occur in case of automatized warehouse management systems.

OBJECT AND SUMMARY OF THE INVENTION

An object of the invention is to solve the known problems of the production of rolls of web material, in particular the problems linked to the down times and the management of the finished products warehouse.

Within this object, an important object of the invention is to provide a method and a plant for producing logs of continuous thin products in optimized manner by tracking defects in the surface and/or the thickness detected on the products.

A further object of the invention is to provide a method and a plant for producing logs of continuous thin products in optimized manner by tracking defects in the surface and/or the thickness detected on the products, allowing to avoid down times.

A further object of the invention is to provide a method and a plant for producing logs of continuous thin products in optimized manner by tracking defects in the surface and/or the thickness detected on the products, which facilitates the handling of the logs produced in the plant.

Last but not least, a further object of the invention is to provide a method and a plant for producing logs of continuous thin products in optimized manner by tracking defects in the surface and/or the thickness detected on the products, that facilitates the further processing of the logs downstream of the production of the master roll, even outside the plant where the master roll has been produced.

These and other objects, that will be more apparent below, are achieved through the method of claim 1 and the plant of claim 20.

According to a first aspect, the invention relates to a method for producing logs of endless thin products in an optimized way, providing for tracking product parameters detected in the log winding steps, for example rewinding, said method comprising the steps of:
  cutting a thin product into a plurality of strips,
  winding said strips of a plurality of adjacent logs,
  detecting, before or after the cutting step, parameters associated with said thin product, storing information on said parameters in a database system, outside the log, for at least one log of said plurality of adjacent logs, assigning an ID code to said at least one log, marking said at least one log with said ID code, associating, in said database system, said information on said parameters to said ID code of said at least one log, so that information on said parameters of the corresponding log are associated, in said database, to a given ID code, sharing, in subsequent processing steps of said at least one log, the information on said parameters stored in the database system, i.e. realizing at least one step of using said information on said parameters of at least one log, stored in the database system, in order to optimize at least one subsequent processing of the product wound into said at least one log, said use providing for recognizing the ID code of said at least one log being processed and the processing of the product of the log based on the information on the parameters of the log.

Practically, the idea is to identify product parameters, measured during a log winding step, and to associate them to that log, so that the subsequent operations on this log take into account these parameters (practically, the product parameters are historicized on the roll).

According to preferred embodiments, the database system is associated with a server telematically accessible remotely, and wherein said step of winding said thin product into a plurality of logs occurs in a first plant and wherein, after said winding, at least one further processing on at least one of said logs occurs in an optimized manner in a second plant, using the information on the parameters associated with the corresponding log stored in the remotely accessible database system.

This practically allows optimizing the production process of thin products even downstream of the plant where the first rolls are produced, that is to optimize the production in the so-called converting lines, i.e. the production lines converting the rolls of semi-finished product into a finished product.

According to preferred embodiments, the method comprises a first step of winding a log, called master roll or primary log, and a subsequent second step, called rewinding, of winding said primary log into said plurality of logs, called secondary logs, during said rewinding step occurring said step of cutting into strips, said step of producing a primary log comprising a step of continuously winding said thin product into logs on a winding machine, in order to produce at least one primary log, a step of identifying a first series of said parameters associated with said thin product wound to produce said primary log, a step of storing, in said database system outside the primary log, information on said parameters, a step of assigning a primary ID code to said primary log, a step of marking said primary log with said primary code, a step of associating, in said database system, information on said parameters to said primary ID code of the primary log so that, in said database, to a given primary ID code information are associated on said parameters of the corresponding primary log.

In some embodiments, the step of producing the primary log is not performed and therefore the continuous thin product is directly fed from the production line to a rewinding step, so that from the production line the product is cut into webs of width equal to the rolls to be produced, so as to create a plurality of rolls.

It should be noted that, during rewinding, it is possible to cut only the side trimmings of the thin product being wound on the cores, so that during the rewinding step a single reel can exit with the wound finished product and one or two reels, that shall be discharged, with the trimmings; alternatively, only one log may be present and the trimmings are continuously discharged through suction openings.

In the step of winding into primary log and subsequent rewinding, the rewinding step provides for cutting a common support core into a plurality of secondary support cores on which the product shall be rewound, of transverse width equal to the transverse width of the required secondary logs, unwinding the thin product, cutting the thin product in the product feeding direction; the cut position being such as to cut the product into two or more strips of transverse width equal to the transverse width of corresponding secondary support cores arranged adjacent and aligned together, rewinding said strips on the respective secondary support cores so as to produce secondary logs of thin product, being also provided a step of reading the primary ID code of said primary log, acquiring the information on said parameters of said thin product in said primary log, to which the primary ID code, read by said database system, is associated, being also provided a step of assigning secondary ID codes to respective secondary logs, a step of marking said secondary logs by means of respective secondary ID codes, changing the information on the first series of parameters of said primary log into information on the second series of parameters of each secondary log, a step of associating, in said database system, said secondary ID codes to the respective information on the parameters on corresponding secondary logs, so that to each secondary log a second series of parameters is associated.

Preferably, the number and/or the transverse width of said plurality of secondary support cores, and therefore the corresponding cut of the thin product coming from the primary log or master roll, are determined taking into account the information related to the series of parameters of said thin product in said primary log, so that in each secondary log a desired second series of parameters is associated. Therefore, preferably, the cut of said plurality of secondary support cores, and therefore the corresponding cut of the thin product coming from the primary log or master roll, provides for cut positions transverse to the unwinding direction of the primary log that are a function of the information on the desired series of parameters of said thin product in said primary log (B1), or independent of the information on the series of parameters of said thin product in said primary log (B1).

The method preferably comprises a step of deleting the primary ID code from the primary log or master roll once it has been rewound into secondary logs.

According to particularly preferred embodiments, the parameters comprise defects in the surface and/or the thickness of the thin product. The information on said parameters related to the defects preferably comprise the position of said defects on the log; preferably said information on the position comprise the coordinates of the defects on the log in terms of product meters unwound from the center of the log and distance from an edge of the log.

Identifying the position of the defects on the logs and transferring said information to the defects on the thin products produced from said logs downstream of the production thereof allows to optimize the entire production chain knowing the quality level of the final product and being possible to intervene to eliminate the whole defective product or a part thereof.

According to preferred embodiments, the parameters of the thin product also comprise one or more of the following: mechanical parameters, among which the e-modulus and/or the Poisson's ratio, winding parameters, among which the density profile of the log and/or tension and/or sliding, and/or NIP, position of joins for removing defects.

Preferably, in addition to the information on said detected parameters, in said database system there are, associated with the ID code of a log, general information related to the log, such as one or more of the following: log dimensions, weight, product material, and commercial data.

According to preferred embodiments, the winding of the product is performed on a support core of the respective log, said marking occurring on said support core or on the outside of the log.

According to preferred embodiments, the marking of the logs is performed on the respective support cores, preferably before the beginning of the step of winding the thin product on the support cores, or after the winding, on the outside of the log.

According to preferred embodiments, the marking of at least one said log is a graphic, electronic or magnetic marking, or a mix thereof.

The marking of said at least one log is preferably performed through application of a support that can be a) graphical or b) electronic, for example RFID, or c) a magnetic tape. Preferably, in the case of electronic or magnetic support, a programming step is provided for assigning said primary ID code to said support, occurring before applying the support to said at least one log, or when said support is applied to the primary log.

According to preferred embodiments, the method comprises, after the step of winding the thin product into logs, a step of rejecting, if necessary, one or more logs based on the information on the parameters associated with each log, said rejecting step comprising a step of reading the ID codes of the logs, the interaction with said database system of said ID codes to access the information on the parameters of the respective logs and a decision step for deciding which logs shall be rejected.

According to preferred embodiments, the method also comprises
a step of moving said at least one log from the winding area to a packing area,
a step of reading the ID codes of said at least one log arrived to the packing area,
a step of packing in packs formed by at least one log,
creating, in a database system, an association formed by the secondary codes of the logs forming each pack.

According to preferred embodiments, the method comprises, before the packing step, said step of rejecting, if necessary, one or more logs based on the information on the parameters associated with each log.

according to preferred embodiments, said subsequent processing on said at least one log provide for the rewinding into logs of smaller dimensions, taking into account said information on the position of the defects on the respective log that are stored in the database system, preferably accessible remotely.

According to preferred embodiments, said step of detecting said parameters including defects in the surface and/or thickness of said thin product occurs before the beginning of the winding in log or on the outer surface of the log.

According to a further aspect, the method also relates to the production of logs of continuous thin products in optimized fashion by specifically tracking at least defects in the surface and/or the thickness detected on the products, comprising
a step of continuously winding said thin product into logs on a winding machine, in order to produce at least one primary log,
a step of identifying any defects in the surface and/or the thickness of said continuous thin product,
a step of storing in a database system, outside the primary log, information related to said defects comprising at least the position of said defects with respect to a reference system associated with the primary log,
a step of assigning a primary ID code to said primary log,
a step of marking said primary log with said primary code,
a step of associating, in said database system, information on said defects with the primary ID code of the primary log, so that, in said database, to a given primary ID code information are associated related to defects in the surface and/or the thickness of the respective primary log, that can be identified based on their position on the primary log,
a step of using said information on the defects of the primary log, stored in the database system, in order to optimize at least one subsequent processing of the product wound into the respective primary log, said use providing for recognizing the primary code of the primary log being processed and the processing of the product based on the information on the surface defects associated to the primary log.

Adequately, the step of detecting any defects in the surface and/or thickness of said continuous thin product occurs before the beginning of the winding in primary log or on the outer surface of the primary log.

Preferably, said at least one subsequent processing optimized through said step of using said information on defects of the primary log stored in the database system comprises a step of rewinding, after winding in primary log, of the thin product in secondary logs of desired transverse length, said rewinding providing for the following:
cutting a common support core into a plurality of secondary support cores on which the product shall be rewound, of transverse width equal to the transverse width of the required secondary logs,
unwinding the thin product,
cutting the thin product in the product feeding direction; the cut position being such as to cut the product into two or more strips of transverse width equal to the transverse width of corresponding secondary support cores arranged adjacent and aligned together,
rewinding said strips on the respective secondary support cores so as to produce secondary logs of thin product, being also provided
a step of reading the primary ID code of said primary log,
acquiring the information on the position of said defects of said thin product in said primary log, to which the primary ID code, read by said database system, is associated,
wherein the number and/or the transverse width of said plurality of secondary support cores, and therefore the corresponding cut of the thin product coming from the primary log, are determined taking into account the information related to the position of the defects of said thin product in said primary log, so that in each secondary log a desired second set of defects is provided,
being also provided
a step of assigning secondary ID codes to respective secondary logs,
a step of marking said secondary logs by means of respective secondary ID codes,
a step of transforming the information on the position of the defects on said primary log into information on the position of the defects on each secondary log,
a step of associating, in said database system, said secondary codes with the respective information on the position of the defects on the corresponding secondary logs, so that with each secondary log a set of defects is associated.

According to a further aspect, the invention relates to a method for producing logs of endless thin products in an optimized way, providing for tracking product parameters detected in the log winding steps, said method comprising the steps of:
a first step of winding a log, called master roll or primary log, and a subsequent second step, called rewinding, of winding said primary log into a plurality of logs, called secondary logs, during said rewinding step occurring a step of cutting into strips, said step of producing a primary log comprising
a step of continuously winding said thin product into logs on a winding machine, in order to produce at least one primary log,
a step of identifying a first series of said parameters associated with said thin product wound to produce said primary log,
a step of storing, in said database system outside the primary log, information on said parameters,
a step of assigning a primary ID code to said primary log,
a step of marking said primary log with said primary code,
a step of associating, in said database system, information on said parameters to said primary ID code of the primary log so that, in said database, to a given primary ID code information are associated on said parameters of the corresponding primary log;
said rewinding step providing for
cutting a common support core into a plurality of secondary support cores on which the product shall be rewound, of transverse width equal to the transverse width of the required secondary logs,
unwinding the thin product,
cutting the thin product in the product feeding direction; the cut position being such as to cut the product into two or more strips of transverse width equal to the transverse width of corresponding secondary support cores arranged adjacent and aligned together,
rewinding said strips on the respective secondary support cores so as to produce secondary logs of thin product, being also provided
a step of reading the primary ID code of said primary log,
acquiring the information on said parameters of said thin product in said primary log, to which the primary ID code, read by said database system, is associated, being also provided
a step of assigning secondary ID codes to respective secondary logs,
a step of marking said secondary logs by means of respective secondary ID codes,
changing the information on the first series of parameters of said primary log into information on the second series of parameters of each secondary log,
a step of associating, in said database system, said secondary ID codes to the respective information on the parameters on corresponding secondary logs, so that to each secondary log a second series of parameters is associated;
sharing, in subsequent processing steps of said at least one secondary log, the information on said parameters stored in the database system, i.e. realizing at least one step of using said information on said parameters of at least one secondary log, stored in the database system, in order to optimize at least one subsequent processing of the product wound into said at least one secondary log, said use providing for recognizing the ID code of said at least one secondary log being processed and the processing of the product of the log based on the information on the parameters of the log.

Further specifications of the method are shown in the embodiments and the examples disclosed above, related to the first aspect of the invention described above.

In further embodiments, during the rewinding step with a plurality of secondary support cores, the number and/or the transverse width of said plurality of secondary support logs, and therefore the corresponding cut of the thin product coming from the primary log or master roll, are determined taking into account the information related to the series of parameters of said thin product in said primary log, so that in each secondary log a desired second series of parameters is associated, Preferably, the cut of said plurality of secondary support cores, and therefore the corresponding cut of the thin product coming from the primary log or master roll, provides for cut positions transverse to the unwinding direction of the primary log that are
a function of the information on the desired series of parameters of said thins product in said primary log, or
independent of the information on the series of parameters of said thin product in said primary log.

According to another aspect, the invention relates to a plant for producing logs thin products, comprising:
a winding station for winding the thin product into a plurality of logs on corresponding support cores, coaxial with and adjacent to one another,
a cutting device, with a plurality of blades, arranged opposite the support cores,
a plant management electronic center,
graphic or electronic or magnetic supports applied to said logs,
a first reading and/or writing device for reading and/or writing on said supports, suitable to write or to program said support, associated with said winding station and operatively connected to said management electronic center,
at least one detection device for detecting parameters of the thin product being wound on said logs, said parameters comprising one or more of the following: a) defects in the surface and/or the thickness of the thin product, preferably comprising the position of said defects on the log; preferably said information on the position comprise the coordinates of the defects on the log in terms of product meters unwound from the center of the log and distance from an edge of the log, b) mechanical parameters, among which, for example, e-modulus and/or Poisson's ration, c) winding parameters, among which log density profile and/or tension and/or sliding and/or NIP, d) position of joins for removing defects.

According to preferred embodiments, the plant is adapted to implement a method according to one or more of the embodiments described above.

According to further embodiments, the plants also comprises a production line for producing an endless thin product, at least one winder arranged at the exit of said production line of endless thin product, suitable to wind the thin product coming from said production line into a primary log or master roll, said winder comprising a mandrel for a cylindrical primary support core on which said thin product shall be wound, at least one rewinder comprising in turn a station for producing secondary support cores for the secondary logs to be formed said winding station providing an unwinding area for unwinding the primary log to be unwound, an area for arranging the secondary support cores coaxially with and adjacent to one another opposite said unwinding area, said cutting device, with a plurality of blades, arranged between said unwinding area and said area where the secondary cores are arranged, position translating devices being associated to said plurality of blades for moving said blades parallel to the rotation axis of the primary log being unwound, in order to adjust the cutting position so as to cut the thin product into strips or endless strips of transverse width equal to the transverse width of the secondary support cores, said plant management electronic center, first graphic or electronic or magnetic supports applied to said primary logs, preferably to said primary cores, second graphic or electronic or magnetic supports applied to said secondary logs, preferably to said secondary cores, a first device for reading and/or writing on said supports, suitable to write or program said first supports, associated with said winder and operatively connected to said management electronic center, a second device for reading and/or writing on said supports, associated with said rewinder and operatively connected to said management electronic center, suitable to read said first supports when said primary logs are arranged on said rewinder, a third device for reading and/or writing on supports, associated with said rewinder and operatively connected to said management electronic center, suitable to program or write on said second supports present on the rewinder, said at least one detection device for detecting product parameter, preferably defects in the surface and/or the thickness of the thin product, winding on said winder.

Preferably, the plant comprises a said detection device for detecting product parameters, preferably defects in the surface and/or the thickness of the thin product, even winding in said rewinder.

Preferably, the plant management electronic center performs the following:

storing in a database system, outside said at least one log, information related to said parameters of the thin product, programming, for each log, the respective applied support, assigning an ID code thereto, associating, in said database system, information on said parameters of said log with the ID code of the log, so that, in said database system, to a given ID code information are associated related to parameters of the product wound on the respective log, reading the ID code of said log by means of said reading and/or writing device, acquiring the information related to said parameters of said thin product in said log, to which the ID code read by said database system is associated, programming said supports, assigning thereto a new respective ID code, associating, in said database system, said ID codes with the respective information on said parameters of the corresponding logs, so that to each log a series of parameters is associated.

According to preferred embodiments, the plant management electronic center performs the following:

storing in a database system, outside the primary log, information related to said parameters and at least to defects detected by said parameter detection device, comprising at least the position of said defects with respect to a reference system associated with the primary log, programming, for each primary log, the respective magnetic first support, assigning a primary ID code thereto, associating, in said database system, information on said defects related to a said primary log with the primary ID code of the primary log, so that, in said database system, to a given primary ID code information are associated related to defects in the surface and/or the thickness of the respective primary log, that can be identified based on their position on the primary log, a step of reading the primary ID code of said primary log by means of said second magnetic reading and/or writing device, acquiring information related to the position of the defects in said thin product in said primary log, to which the primary ID code read by said database system is associated, programming said second magnetic supports, assigning a respective secondary ID code thereto, transforming the information on the position of the defects on said primary log into information on the position of the defects on each secondary log, associating, in said database system, said secondary codes with the respective information on the position of the defects on the corresponding secondary logs, so that with each secondary log a set of defects is associated.

Preferably, the number and/or the transverse width of said plurality of secondary support cores, and therefore the corresponding cut of the thin product coming from the primary log, are determined taking into account the information related to the position of the defects of said thin product in said primary log, so that in each secondary log a desired second set of defects is provided.

According to preferred embodiments, the plant comprises a packing station for packing the secondary logs, produced by said at least one rewinder, into packs, at the entrance of said packing station a fourth magnetic device for reading and/or writing on graphic, electronic or magnetic supports is provided, operatively connected to said management electronic center, suitable to read the secondary codes stored on said second magnetic supports associated with said secondary logs to prepare the packs according to a given production order; preferably at the entrance of said packing station the rejection being provided of secondary logs containing a high number of defects.

According to preferred embodiments, the plant comprises a labeling device for labeling the formed packs; preferably said labels to be applied to the packs being third graphic, electronic or magnetic supports and said labeling device comprising a sixth device for reading and/or writing on respective supports, that is operatively connected to said management electronic center, suitable to program said third supports with a respective third ID code.

According to preferred embodiments, the electronic supports are RFID supports and said reading and/or writing devices for reading and/or writing on electronic supports are RFID antennas.

BRIEF DESCRIPTION OF THE DRAWINGS

Further characteristics and advantages of the invention will be more apparent from the description of some preferred, although not exclusive, embodiments, illustrated by way of non-limiting example in the attached tables of drawings, wherein.

DETAILED DESCRIPTION OF AN EMBODIMENT OF THE INVENTION

Figure 1:
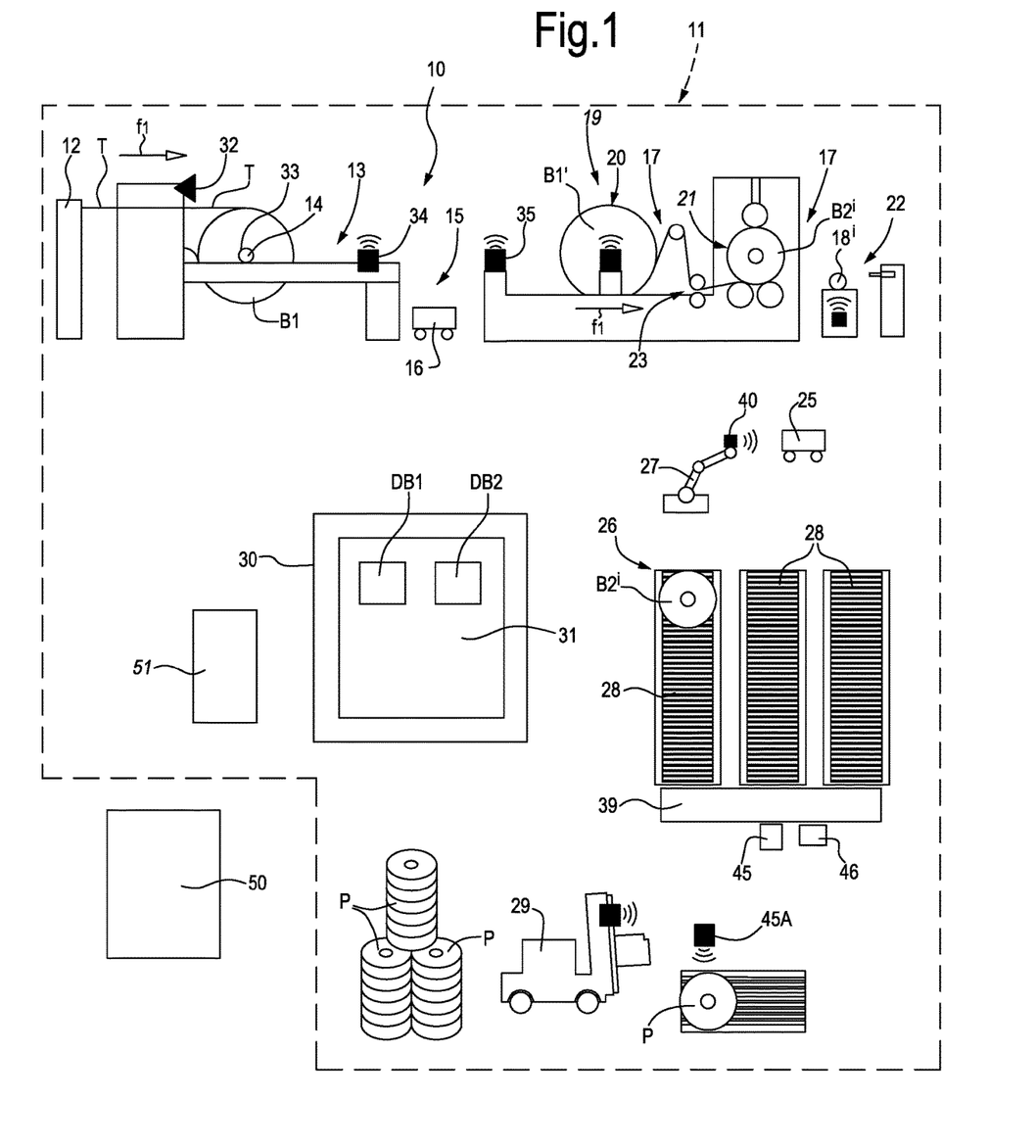
FIG. 1 is a schematic view of a plant for producing logs of thin product according to the invention.
Figure 2:
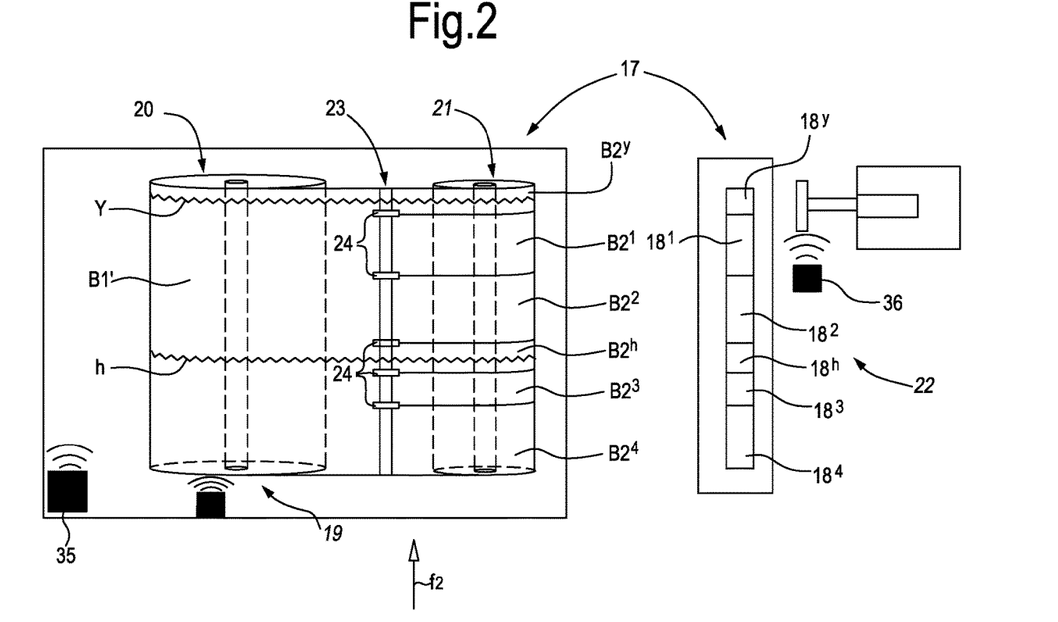
FIG. 2 is a schematic view from the top of a rewinder used in the plant of FIG. 1.
Figure 3:
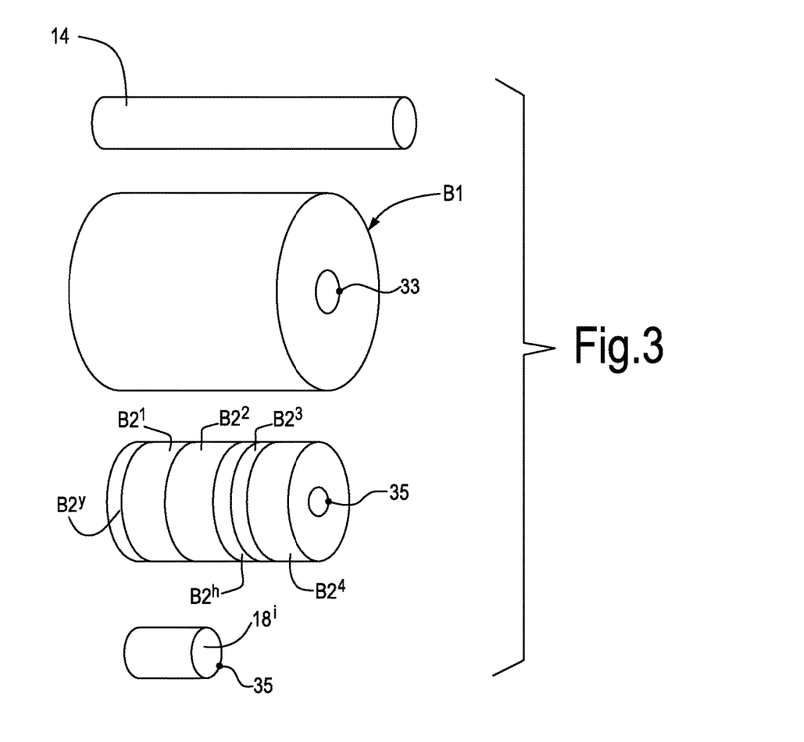
FIG. 3 is a set of reels and support cores for reels used in the plant of FIG. 1.

With reference to the above-cited figures, a first scheme of a first plant according to the invention is indicated as a whole with number 10. The plant is inside a production plant 11, adapted to produce and store master rolls, also called herein primary logs B1, and to produce, from the master rolls B1, further rolls, herein called also secondary logs $B2^i$.

The term "transverse" means a direction orthogonal to the feed direction f1 of the thin product, i.e. a direction parallel to the axis of rotation of the master roll B1 and to the axis of the secondary cores $18^i$ and therefore to the secondary logs $B2^i$.

Firstly, the components of the known plant 10 will be described below. The plant 10 comprises a production line for producing a continuous thin product T, i.e. a web product, such as for example paper, tissue paper, non-woven fabric, or other similar products (films, multi-material products etcetera), whose end part is indicated with number 12.

At the end of the production line 12 one or more winders 13 are arranged (in the figures only one winder is shown). The winder 13 comprises a mandrel on which a cylindrical tubular core is arranged supporting the thin product T and indicated below as primary support core 14. The primary support core is driven into rotation in the direction of the forward movement f1 (machine direction) of the thin product T on the line 12, wherein the product is consequently wound on the primary core 14 to form the master roll or primary log B1.

Downstream of the winder 13 an unloading area 15 is arranged, where at least one first moving device 16 is arranged for moving the primary logs B1 towards a packing area, or a storing area or even directly towards one (or more) rewinders 17 (in the scheme only one rewinder is shown), which, starting from the primary logs B1, realizes secondary logs $B2^i$, as better described below.

At least one second moving device 25 is provided, adapted to move the produced secondary logs towards a packing station 26.

In this example, the packing station 26 comprises a robot 27, for example an anthropomorphous arm, that takes the secondary logs from the moving device 25 and put them on one (or more) conveyors 28. A packing device 39 is provided at the end of the conveyor 28, for example for packing by means of a film covering one or more secondary logs $B2^i$.

Through a third moving device 29 the pack formed with one or more secondary logs is carried from the packing station 26 to the storing area.

The plant 10 provides for an electronic control apparatus 30 for controlling the various parts, providing for PLC systems for managing the operation of the various parts and interface PC that are operatively connected together via a network. The electronic control apparatus 30 also comprises a database system 31 comprising one or more sub-databases with the information uploaded before starting the production and those acquired during the various work steps. The database system 31 allows the various parts to inter-act in coordinated fashion.

According to the invention, a device 32 is provided for detecting parameters associated with the thin product T wound by the winder 13 to form the master roll B1, comprising defects in the surface and/or the thickness of the thin product. These parameters may also comprise one or more of the following: mechanical parameters, among which the e-modulus and/or the Poisson's ratio, winding parameters, among which the density profile of the log and/or tension and/or sliding, and/or NIP, position of joins for removing defects.

"Tension" is mechanical tension imparted to the product, which can be measured by means of load cells. "Sliding" is the over-speed imparted to the rollers involved in winding the product with respect to the unwinding speed of the product upstream or to the production speed. "NIP" is the force per width unit imparted between the reel being wound and the rollers involved in the winding process (called support rolls and rider rolls). The log density profile is calculated based on the weight and the diameter of the log under formation, whilst the e-modulus of the thin product is calculated by measuring or calculating the tension of the product and the elongation resulting from sliding. The Poisson's ratio is measured through the elongation derived from sliding and the shrinking of the product measure by means of an optical vision system.

As regards the joints for removing defects, reference is made to the position of these joints on the extension of the thin product that have been created by transversally cutting the product downstream and upstream of damaged areas and joining the resulting edges.

The parameters also include the weight of the respective log, measured for example through load cells or calculated by knowing the grammage of the product, the width and the number of meters wound, and the physical dimensions of the reels (wound meters, diameter, width etcetera).

The most important parameters are the defects in the surface and/or the thickness of the product (that may also include the thickness of the treatments done on the product, for example the coating thickness in the case of paper). Below specific reference will be made to the case of defects in the surface and/or the thickness, being understood that the inventive concept can be also extend to all the other product parameters indicated above, that can be associated with each respective log. In this case, other detection devices will be provided in the plant to perform the desired detection.

As mentioned, in this example, the device 32 detects the defects in the surface or the thickness (or, more in general, the parameters) associated with the thin product T being wound in the winder 13 to form the master roll B1. For example, the detection device 32 comprises a vision system with a camera, and/or a QCS system and/or a metal detection system, all these systems being known.

The vision systems are systems that, through image acquisition, are able to detect defects such as holes, tears, folds, foreign parts etcetera. For example, the QCS systems are based on the reflection and/or the refraction of infrared sources or on the absorption of beta particles and allow for example to detect the thickness profile of the product, the grammage profile, the relative humidity profile, the thickness profile of special finishings (coating); these parameters are associated to the quality of the product. Excessive differences of these measurements with respect from the reference values mean defects of the product. The metal detection systems are systems adapted to detect the presence of metal foreign bodies in the product, even smaller than one millimeter.

The detection device 32 (including one or more of the above mentioned systems) is arranged for example between the exit of the production line 12 and the winder 13, or preferably on this latter or near this latter. The detection system 32 associates the defects with the position they have on the master roll B1 according to a reference system associated with the master roll, comprising for example the position coordinates of the defects in the master roll in terms of meters of product unwound from the center of the master roll and of distance from an edge of the master roll.

The information on the defects are stored in a first database DB1 of the database system 31; in addition to the number and the position of the defects (or, more in general, parameters) on the master roll, the information also comprise, for example, also the type of defects detected.

Before winding the product T on the primary core 14 at the winder 13, to form the master roll B1, the primary support core 14 is electronically marked by applying a first label or RFID support 33, for example on an outer edge of the primary core 14.

Once the primary log B1 has been realized, through a first electronic device for reading and/or writing on electronic supports, for example an RFID antenna 34 operatively connected with the electronic control apparatus 30 and arranged at the exit of the winder 13, a primary code X is assigned to the RFID label 33, having a match in a second database DB2 of the database system 31.

The electronic apparatus 30 makes an association, in said second database DB2, between the information on the defects (or, more in general, parameters) detected on the product T (number, position and type) of the primary log present in the first database DB1 and the primary ID code X of the primary log, so that in this second database DB2, to a given primary ID code information are associated on the defects in the surface and/or the thickness of the respective primary log, that can be identified based on their position on the log.

Obviously, the primary ID code X can be assigned to the RFID label 33 also before the beginning of the step of winding the product T on the winder 13 (the assigning may occur for example before applying the RFID label to the primary core, or immediately after this), whilst the association of the detected defects (or, more in general, parameters) occurs when the winding step is finished. Moreover, the RFID label 33 may be applied to the primary support core 14 even after the step of winding on the winder 13 (and the code can be assigned before applying the RFID label to the primary log, or immediately after that).

From the unloading area 15 of the winder 13, the primary log B1, through the first moving device 16 (for example a carriage or a shuttle), is carried and loaded on the rewinder 17. Here, a second electronic device for reading and/or writing on electronic supports, for example a second RFID antenna 35, reads the primary ID code X of the primary log B1 programmed in the electronic RFID label 33. Therefore, the electronic apparatus 30 identifies the primary log being processing, and, through the primary code X, acquires the information on the defects (or, more in general, parameters) stored in the first database DB1.

The rewinder 17 comprises a station 22 where the tubular cylindrical secondary support cores $18^i$ are produced for the secondary logs $B2^i$ to be formed, and a winding station 19 providing for an unwinding area 20 for unwinding the master roll, an arranging area 21 for arranging the secondary support cores $18^i$ coaxial and adjacent to one another, in front of the unwinding area 20, and a cutting device 23, with a plurality of blades 24, arranged between the unwinding area and the arranging area 21. Position translators (not shown) are associated with the blades 24 to move the blades according to the direction f2, i.e. transversally to the unwinding direction, and to adjust the cut position so as to cut the thin product into continuous webs of transverse width equal to the transverse width of the secondary support cores $18^i$.

As mentioned, the electronic apparatus 30 identifies the primary log B1 being processing at the rewinder 17, and, through the primary code X, acquires the information on the desired parameters (defects or other mechanical or winding parameters) stored in the first database DB1.

Therefore, the electronic apparatus 30 takes into account the information on the desired series of parameters of the thin product in the primary log B1 being processed at the rewinder 17. The electronic apparatus 30 manages the rewinding step based on the production needs, determining the number and/or the transverse width of the plurality of secondary support cores $18^i$, and therefore the corresponding cut of the thin product coming from the primary log or master roll B1. Therefore, a desired second series of parameters is associated with each secondary log $B2^i$ produced from the primary log B1.

In the simplest case, the cut of the thin product of the log B1 occurs according to pre-set production needs. The production needs require, for example, starting from the primary log B1, six secondary logs $B2^i$ of given width, for example all equal to one another, or some equal to one another and other of different width. FIG. 2 shows the case of production needs for six secondary logs $B2^i$ of different width, starting from a primary log or master roll B1'.

The electronic apparatus 30 manages the rewinding step by using the production information related to the dimensions of the logs to be produced, adequately positioning the blades of the cutting device 23.

Moreover, the electronic apparatus 30 controls the station 22 where the secondary support cores $18^i$ are produced so that these secondary cores 18i are produced so as to realize the secondary logs according to the production specifications (the secondary cores 18' have the same transverse width as the webs of the respective secondary logs). Once the cores have been produced and positioned on the area 21, the thin product is unwound from the log B1', cut and wound in the corresponding cores.

For example, on the primary log B1' of FIG. 2 two areas h and y have been detected with surface defects (or, more in general, desired mechanical, unwinding parameters, defects etc. have been detected) arranged, for instance, near the centerline of the primary log and near an edge, repeated along the whole winding extension in a substantially constant manner. These defects are stored in the first database DB1 and associated with the code X1 identifying the log B1'. Once the primary log B1' is on the rewinder 17, the electronic apparatus 30 reads the code X1 from the respective first RFID label 33 and identifies the maps of defects h and y associated with the log. Then, the electronic control apparatus 30 transforms the information on the position of the defects on the primary log B1' into information on the position of the defects on each secondary log B2$^i$ to be produced.

Adequately, once realized, the secondary support cores 18$^i$ are electronically marked by applying respective second electronic RFID labels or supports 35.

By means of a third electronic device for reading and/or writing on electronic supports, for example a third RFID antenna 36 provided in the rewinder 17, the electronic control apparatus 30 assigns to the second RFID labels 35 of the secondary cores 18$^i$ respective secondary ID codes K$^i$, having a match in the second database DB2 of the database system 31.

The electronic control apparatus 30, as already mentioned, has transformed the information on the position of the defects on the primary log B1' into information on the position of the defects on each secondary log B2$i$, for example the coordinates of the position of the defects on the secondary logs in terms of meters unwound from the center of the secondary log and of distance from an edge of the secondary log (i.e. with respect to a reference system integral with the secondary log). The apparatus 30 therefore associated, in the second database DB2, the secondary codes K$^i$ and the respective information on the position of the defects on the respective secondary logs B2$^i$, so that to each secondary log B2$^i$ a set of desired parameters (defects, mechanical parameters, unwinding parameters etc.) is associated and this set is stored, in association with the code of the secondary log, in the database system 31. In the example of FIG. 2, six secondary logs B2$^1$, B2$^2$, B2$^3$, B2$^4$, B2$^y$ and B2$^h$ have been produced (with cores 18$^h$-18$^1$-18$^2$-18$^y$-18$^3$-18$^4$).

Consequently, for each secondary log B2$^i$ a map of desired parameters (defects, mechanical parameters, unwinding parameters, etc.) is known, that can be used in order to optimize the subsequent steps of production of products coming from these secondary logs, if necessary even in a second plant, other than the plant where they have been produced, as the database system 31 with the information can be shared between the electronic management systems of the second plant. For example, the logs B2$^y$ and B2$^h$ can be rejected, or marked as of lower quality, or used in downstream production processes, communicating to the respective production system when to intervene for overcoming the detected defects.

Practically, in this example, the cut of said plurality of secondary support cores, and therefore the corresponding cut of the thin product coming from the primary log or master roll, provides for cut positions transverse to the unwinding direction of the primary log that are independent of the information on the series of parameters of the thin product in the primary log.

According to some embodiments, the electronic apparatus 30 can organize the rewinding step by using the information on the defects of the primary log B1 stored in the database system 31, so as to optimize this step.

For example, the electronic apparatus 30, based on the information on desired parameters (defects, mechanical parameters, unwinding parameters, etc.), can calculate the number of secondary logs B2$^i$ to be produced, avoiding the area of the thin product T wound in the primary log B1 where there is the greater number of defects, i.e. realizing a given number of secondary logs of acceptable quality (i.e. with a number of defects minimum or null) and a given number of secondary logs with a high number of defects, that will be rejected (or qualified as "low quality"). This is done by positioning the blades of the cutting device 23 in the transverse direction of the product in the most adequate manner in order to isolate the defects in the secondary logs to reject. Practically, in this second example, the cut of said plurality of secondary support cores, and therefore the corresponding cut of the thin product coming from the primary log or master roll, provides for cut positions transverse to the unwinding direction of the primary log that are a function of the information on the desired series of parameters of the thin product in the primary log.

Before positioning the blades of the cutting device 23, the electronic apparatus 30 controls the station 22 where the secondary support cores 18$^i$ are produced so that these secondary cores 18$^i$ are produced in an optimized manner as described above (the secondary cores 18$^i$ have the same transverse width as the webs of the respective secondary logs). Practically, the number and/or the transverse width of the plurality of secondary support cores 18$^i$, and therefore the corresponding cut of the thin product coming from the primary log B1, are determined taking into account the information related to the position of the defects of the thin product in the primary log, so that in each secondary log B2$^i$ a desired second set of defects is provided.

In the database system 31 are therefore stored the secondary logs to be rejected and the secondary logs to be forwarded to the following production steps.

For example, again with reference to FIG. 2, two areas h and y with surface defects have been detected on the primary log B1'. These defects are stored in the first database DB1 and associated with the code X1 identifying the log B1'. Once the primary log B1' is on the rewinder 17, the electronic apparatus 30 reads the code X1 from the respective first RFID label 33 and identifies the maps of defects h and y associated with the log. Then, the electronic control apparatus 30 transforms the information on the position of the defects on the primary log B1' into information on the position of the defects on each secondary log B2$^i$ to be produced. Based on this, the electronic control apparatus 30 controls the station 22 so that the secondary support cores 18$^i$ are produced so as to create a first series of secondary logs B2$^i$ according to the production needs (in the example four secondary logs B2$^1$ . . . B2$^4$), and two secondary logs B2$^y$ and B2$^h$ containing the two areas h and y with the defects. Therefore, four secondary support cores 18$^i$ are produced of the desired transverse width (accordingly to the production orders regarding the logs dimensions) and two secondary support cores 18$^y$ 18$^h$ (containing a high number of defects and, therefore, to be rejected), according to the following order (from an outer edge to the following one): 18$^h$-18$^1$-18$^2$-18$^y$-18$^3$-18$^4$.

In the station 22, the secondary support cores are produced by cutting a common tubular cylindrical support core into six parts, into the plurality of secondary support cores (with the above specified dimensions) on which the product T being rewound will be wound (in some embodiments, the station where the cores are realized can be omitted).

The secondary support cores, coaxial and adjacent to one another in the order 18$^h$-18$^1$-18$^2$-18$^y$-18$^3$-18$^4$, are arranged in the area 21 of the rewinder 13. Analogously, the electronic apparatus 30 arrange the five blades 24 of the cutting device 23 so as to cut the product T exiting from the primary log B1', according to the machine direction, into webs corresponding to the interfaces between the secondary support cores $18^h$-$18^1$-$18^2$-$18^y$-$18^3$-$18^4$.

Then, the rewinding step starts, i.e. the unwinding of the thin product T from the primary log B1' and the following winding of the product T, adequately cut by the device 23 in the positions described above, on the secondary cores $18^i$, so as to realize the secondary logs $B2^i$.

Adequately, once realized, the secondary support cores $18^h$-$18^1$-$18^2$-$18^y$-$18^3$-$18^4$ are electronically marked by applying respective second electronic RFID labels or supports 35.

By means of a third electronic device for reading and/or writing on electronic supports, for example a third RFID antenna 36 provided in the rewinder 17, the electronic control apparatus 30 assigns to the second RFID labels 35 of the secondary cores $18^i$ respective secondary ID codes $K^i$, having a match in the second database DB2 of the database system 31.

The electronic control apparatus 30, as already mentioned, has transformed the information on the position of the defects on the primary log B1' into information on the position of the defects on each secondary log $B2^i$, for example the coordinates of the position of the defects on the secondary logs in terms of meters unwound from the center of the secondary log and of distance from an edge of the secondary log (i.e. with respect to a reference system integral with the secondary log). The apparatus 30 therefore associated, in the second database DB2, the secondary codes $K^i$ and the respective information on the position of the defects on the respective secondary logs $B2^i$, so that to each secondary log $B2^i$ a set of defects is associated and this set is stored, in association with the code of the secondary log, in the database system 31.

Moreover, in the database system 31, associated with the secondary ID code $K^i$ of a secondary log $B2^i$, there are, in addition to the information on the position of the defects in the surface and/or the thickness, also general information on the log, such as the dimensions of the secondary log, the weight, the type of produced material, and sales data.

Consequently, for each secondary log $B2^i$ a map of defects is known, that can be used in order to optimize the subsequent steps of production of products coming from these secondary logs, if necessary even in a second plant, other than the plant where they have been produced, as the database system 31 with the information can be shared between the electronic management systems of the second plant.

Preferably, the secondary logs $B2^i$ are marked on the respective secondary support cores $18^i$ before the step of winding the thin product on the secondary cores. In other embodiments, the marking can be performed after the winding, i.e. when the secondary logs $B2^i$ have been finished and/or unloaded from the rewinder 13.

The programming step for assigning the secondary ID code $K^i$ to the respective second RFID label 35 can be performed before applying the second RFID label t the corresponding secondary log, or once the second RFID label has been applied to the secondary log, as described above (and secondary ID code $K^i$ can be also assigned after the step of winding the product on the respective second core $18^i$, but in any case preferably before the secondary log $B2^i$ exit the rewinder 13.

Once the primary log B1' has been rewound into secondary logs $B2^i$, the primary log no longer exists and therefore the electronic control apparatus 30 deletes the data stored in the first RFID label and the first support core can be used again for a new primary log. Therefore, the information associated with the primary ID code X can be deleted from the database system 31.

Once the secondary logs $B2^i$ with the respective second labels have been realized, they are moved from the rewinder 13, through the second moving devices 25, for example carriages or shuttles, to the packing station 26.

In other embodiments, in the plant the winder can be not provided, and the continuous thin product is fed from the production line directly to a winder like a rewinder, so that from the production line the product is cut into webs of width equal to the support cores present in the rewinder, so as to create a plurality of logs that then will be moved to the packing area or to other processing areas.

It should be noted that the cut in a rewinder may provide only for the cut of the side trimmings of the thin product being wound on the cores, so that from the rewinding a single log can exit with the wound finished product and one or two logs with the trimmings, that shall be rejected; alternatively, only one log may be present and the trimmings are continuously discharged through suction openings.

It should be noted that, in other embodiments, one or more detection device can be provided in the rewinder for detecting product parameters analogously to the detection device 32 (the parameters can comprise all the parameters indicated above or only some of them), for example defects in the thickness or the surface (it can also comprise, for example, a device for detecting metal particles as described above). The parameters detected according to the position on the respective log are associated with the code of the respective log produced in the rewinder and stored in the database system.

In the packing station 26 a fourth electronic device is provided for reading and/or writing on electronic supports, for example a fourth RFID antenna 40 that is operatively connected with the electronic control apparatus 30, reading the second RFID labels 35 of the second logs $B2^i$ arriving to the station 26, reading the secondary ID codes $K^i$ thereof. Based on this reading, the electronic control apparatus 30 interacts with the second database DB2, accesses the information on the defects of the respective secondary logs $B2^i$ and verifies the logs to be packed and the logs to be rejected. Or, simply, the electronic control apparatus 30 already knows that the secondary logs $B2^i$ associated to a given secondary code $K^i$ are to be rejected (in the previous example, the logs $B2^h$ and $B2^y$ with the codes $K^h$ and $K^y$) and operates accordingly.

The robot 27 takes the secondary logs $B2^i$ to be rejected and put them in a discharged area, whilst the secondary logs $B2^i$ to be packed are arranged in a pile on the conveyor 28, at the end of which a pile of secondary logs $B2^i$ is wound with a covering film so as to form a pack P of secondary logs $B2^i$.

The electronic control apparatus 30 creates, in the database system 31, an association between the secondary codes $K^i$ of the logs forming each pack P. If necessary, in the database system a tertiary ID code F of the pack P is generated, with which the secondary codes of the logs of that pack are associated.

A check station 45, comprising a fifth electronic device for reading and/or writing on electronic supports, such as a fifth RFID antenna 45A, reads the secondary codes $K^i$ from the second RFID labels of the logs forming the pack P, in order to verify whether they are all those programmed or an error occurred during the packing step, i.e. whether there are more secondary logs, or less secondary logs than those programmed.

Adequately, a labeling device 46 electronically marks the pack P, for example by applying a third RFID label 47 to the pack P, and performs the programming thereof through an RFID antenna for assigning a tertiary ID code F to this third RFID label (not shown in the figures).

Alternatively, the third label can be made of paper and indicate the secondary codes $K^i$ of the secondary logs $B2^i$ forming it or the tertiary code F identifying the pack as a whole.

The pack P, formed and verified, is sent in an adequate manner (for example by means of a pallet moved by a forklift) to the warehouse or to the delivering area for being sent to a second plant 50 where the subsequent processing steps will be performed.

With reference again to the primary log B1, once it has been formed in the winder 12, instead of being sent to the rewinder 13, it can be directly sent to the packing station 26 through the moving devices 16. Here, it is packed and sent to the warehouse or directly to the delivering area for being sent to the plant 50 where the subsequent processing steps will be performed.

Adequately, the database system 31, or at least a section thereof, is associated with a server 51 that can be accessed telematically, also remotely, so that from a reading of the primary ID code X associated with the first RFID label 33 during a processing in the second plant it is possible to have information associated with the code X, i.e. with the primary log B1 being processed, and therefore information on the position of the defects on the primary log. It is therefore possible to optimize the production in this second plant based on this information shared through the database system 31 remotely accessible. It will be therefore possible, for example, to perform a rewinding step in the second plant according to methods analogous to those described above.

Adequately, as the database system 31 is associated with a server that can be telematically accessed remotely, also the information on the secondary logs $B2^i$ can be accessed during the subsequent processing of these logs in a second plant 50. Therefore, from the reading of the secondary codes $K^i$ stored on the second RFID labels 35 provided on the secondary logs $B2^i$ it will be possible to known the information on the position of the defects on these secondary logs and therefore to optimize the production of products from these secondary logs (for example rewinding into logs of smaller dimension, even accordingly to methods different than that described above), this ideally resulting in producing a finished product knowing the defects distribution thereon (or, more in general, the distribution of the desired parameters detected and associated).

In the example described above specific reference has been made to electronic RFID labels and to corresponding RFID antennas for reading/writing the labels. In other embodiments, instead of electronic labels graphic supports may be also used, such as for example paper labels with alphanumeric codes, or bar codes, or QR codes or other codes. In this case, instead of antennas writing and reading the supports remotely, printers are necessary to print the graphic labels and devices for optically reading the graphic symbols. Moreover, labels with magnetic band can be used together with respective devices for writing and reading data stored in the magnetic band.

In general, the supports to which the ID codes are associated can be fixed to the support cores on which the product is wound to create the log, or on the outer surface of the log.

Thanks to the method and the plant according to the invention, it is therefore possible to track the movement of the primary and secondary logs inside the production plant, optimizing in particular the step of rewinding and/or packing, rejecting the portions of primary log containing unacceptable defects detected and historicized during the step of forming the log.

With the method and the plant according to the invention is it possible to historicize in the logs, in addition to the defects, also all the product and process parameters allowing optimization of the subsequent processing of the product wound the respective log.

Moreover, thanks to the use of graphic of RFID labels, all the steps of moving and storing the logs in the plant are facilitated.

Moreover, thanks to the use of graphic or RFID labels in the secondary or primary logs it is possible to track the various parameters indicated above (and in particular the defects) contained therein after the processing in the first production plant. The information of the labels will be useful to access a remote database containing the features of the logs, including the defects thereof. The information will be useful to optimize the whole converting process. The database can be therefore accessed by all the people involved in the processing chain up to the end product.

Last but not least, the use of an RFID label instead of graphical labels allows maintaining the information associated to the labels for a longer time with respect to the paper label. The use of an electronic system for reading the labels also reduces the risk of reading codes by the operators and accelerates the reading steps.

It is understood that what is illustrated purely represents possible non-limiting embodiments of the invention, which may vary in forms and arrangements without departing from the scope of the concept on which the invention is based. Any reference numerals in the appended claims are provided for the sole purpose of facilitating the reading thereof in the light of the description herein before and the accompanying drawings and do not in any way limit the scope of protection.

The invention claimed is:

1. A method for producing logs of continuous thin products in an optimized way, providing for tracking product parameters detected in log winding steps, said method comprising the steps of:
   cutting a thin product into a plurality of strips;
   winding said strips of a plurality of adjacent logs;
   detecting, before or after cutting said thin product into said plurality of strips, parameters associated with said thin product;
   storing information on said parameters in a database system, outside said logs, for at least one log of said plurality of adjacent logs;
   assigning an ID code to said at least one log;
   marking said at least one log with said ID code;
   associating, in said database system, said information on said parameters to said ID code of said at least one log, so that information on said parameters of said corresponding log are associated, in said database, to a given ID code;
   sharing, in subsequent processing steps of said at least one log, said information on said parameters stored in said database system, wherein said information on said parameters of at least one log, stored in said database system, is used in order to optimize at least one subsequent processing of said product wound into said at least one log, said use providing for recognizing said ID code of said at least one log being processed and said processing of said product of said log based on said information on said parameters of said log;

a first step of winding a master roll or primary log, and a subsequent second rewinding step of winding said master roll or primary log into said plurality of secondary logs, during said second rewinding step occurring said step of cutting into strips, said step of producing said master roll or primary log comprising:
  continuously winding said thin product into logs on a winding machine in order to produce at least one primary log;
  identifying a first series of said parameters associated with said thin product wound to produce said master roll or primary log;
  storing, in said database system outside said master roll or primary log, information on said parameters;
  assigning a primary ID code to said master roll or primary log;
  marking said master roll or primary log with said primary code;
associating, in said database system, information on said parameters to said primary ID code of said master roll or primary log so that, in said database system, to a given primary ID code information are associated on said parameters of said corresponding master roll or primary log, wherein said rewinding provides for:
  cutting a common support core into a plurality of secondary support cores on which said product is rewound, of transverse width equal to a transverse width of said secondary logs;
unwinding said thin product;
cutting said thin product in a product feeding direction, wherein a cut position being such as to cut said product into two or more strips of transverse width equal to said transverse width of corresponding secondary support cores arranged adjacent and aligned together;
rewinding said strips on said respective secondary support cores to produce secondary logs of said thin product;
reading said primary ID code of said master roll or primary log;
acquiring said information on said parameters of said thin product in said master log or primary log, to which said primary ID code, read by said database system, is associated;
assigning secondary ID codes to respective secondary logs;
marking said secondary logs by respective secondary ID codes;
changing said information on said first series of parameters of said master log or primary log into information on said second series of parameters of each secondary log;
associating, in said database system, said secondary ID codes to said respective information on said parameters on corresponding secondary logs, such that a second series of parameters is associated with each secondary log.

2. A method according to claim 1, wherein said database system is associated with a server telematically accessible remotely, and winding said thin product into said plurality of logs occurs in a first plant and, after said winding, at least one further processing on at least one of said logs occurs in an optimized manner in a second plant, using said information on said parameters associated with said corresponding log stored in said remotely accessible database system.

3. A method according to claim 1, wherein said parameters comprise defects in a surface and/or thickness of said thin product, said information on said parameters related to said defects comprising a position of said defects on said log, said information on said position comprising coordinates of said defects on said log in terms of product meters unwound from a center of said log and distance from an edge of said log.

4. A method according to claim 1, wherein said winding of said product is performed on a support core of said respective log, said marking occurring on said support core or on said outside of said log.

5. A method according to claim 1, wherein said marking of at least one said log is a graphical, electronic or magnetic marking.

6. A method according to claim 1, further comprising, after winding said thin product into logs, rejecting, if necessary, one or more logs based on said information on said parameters associated with each log, said rejecting one or more logs comprising a step of reading said ID codes of said logs, interaction with said database system of said ID codes to access said information on said parameters of said respective logs and a decision step for deciding which logs are rejected.

7. A method according to claim 1, further comprising:
  moving said at least one log from a winding area to a packing area;
  reading said ID codes of said at least one log arrived to said packing area;
  packing in packs formed by at least one log;
  creating, in a database system, an association formed by secondary codes of said logs forming each pack.

8. A method according to claim 1, wherein said subsequent processing on said at least one log provide for rewinding into logs of smaller dimensions, taking into account said information on a position of defects on said respective log that are stored in said database system, accessible remotely.

9. A method according to claim 1, wherein detecting said parameters including defects in a surface and/or thickness of said thin product occurs before a beginning of said winding in log or on an outer surface of said log.

10. A method according to claim 1, wherein, taking into account said information on a series of said parameters of said thin product in a primary log, said method determining a number and/or a transverse width of a plurality of secondary support cores, and said corresponding cut of said thin product coming from said primary log, to each secondary log being associated a desired series of parameters.

11. A method according to claim 1, wherein a rewinding step is provided with a plurality of secondary support cores, wherein a number and/or a transverse width of said plurality of secondary support logs, and said corresponding cut of said thin product coming from a primary log or master roll, are determined taking into account said information related to said series of parameters of said thin product in said primary log or master roll, so that in each secondary log a desired second series of parameters is associated.

12. A method according to claim 10, wherein cutting of said plurality of secondary support cores, and corresponding cut of said thin product coming from said primary log or master roll, provides for cut positions transverse to an unwinding direction of said primary log that are:
  a function of said information on said desired series of parameters of said thin product in said primary log; or independent of said information on said series of parameters of said thin product in said primary log.

13. A plant for producing logs of thin products, the plant comprising:
a winding station for winding a thin product into a plurality of logs on corresponding support cores, coaxial with and adjacent to one another;
a cutting device, with a plurality of blades, arranged opposite said support cores;
a plant management electronic center;
graphic or electronic or magnetic supports applied to said logs, wherein a master or primary log is assigned a primary ID code to said master roll or primary log, said master roll or primary log being marked with said primary code, wherein information on said parameters to said primary ID code of said master roll or primary log is associated with a database such that, in said database system, to a given primary ID code information are associated on parameters of said corresponding master roll or primary log;
a reading and/or writing device for reading and/or writing on said graphic or electronic or magnetic supports, configured to write or to program said graphic or electronic or magnetic supports, associated with said winding station and operatively connected to said plant management electronic center;
at least one detection device for detecting said parameters of said thin product being wound on said logs, said parameters comprising one or more of: defects in a surface and/or a thickness of said thin product, comprising a position of said defects on said log, said information on said position comprising coordinates of said defects on said log in terms of product meters unwound from a center of said log and distance from an edge of said log; mechanical parameters; winding parameters comprising log density profile and/or tension and/or sliding and/or NIP; and position of joins for removing defects;
a rewinder configured to:
cut a common support core into a plurality of secondary support cores on which said product is rewound, of transverse width equal to a transverse width of said secondary logs;
unwind said thin product;
cut said thin product in a product feeding direction, wherein a cut position being such as to cut said product into two or more strips of transverse width equal to said transverse width of corresponding secondary support cores arranged adjacent and aligned together;
rewind said strips on said respective secondary support cores to produce secondary logs of said thin product, the plant management electronic center being configured to:
read said primary ID code of said master roll or primary log;
acquire said information on said parameters of said thin product in said master log or primary log, to which said primary ID code, read by said database system, is associated;
assign secondary ID codes to respective secondary logs;
mark said secondary logs by respective secondary ID codes;
change said information on a first series of parameters of said master log or primary log into information on a second series of parameters of each secondary log;
associate, in said database system, said secondary ID codes to said respective information on said parameters on corresponding secondary logs, such that a second series of parameters is associated with each secondary log.

14. A plant according to claim 13, further comprising:
a production line for producing an endless thin product;
at least one winder arranged at an exit of said production line of endless thin product, configured to wind said endless thin product coming from said production line into a primary log or master roll, said at least one winder comprising a mandrel for a cylindrical primary support core on which said endless thin product is wound;
said rewinder comprising:
a station for producing said secondary support cores for said secondary logs to be formed, said winding station providing an unwinding area for unwinding said primary log to be unwound;
an area for arranging said secondary support cores coaxially with and adjacent to one another opposite said unwinding area;
said cutting device, with a plurality of blades, arranged between said unwinding area and said area where secondary cores are arranged, position translating devices being associated to said plurality of blades for moving said blades parallel to a rotation axis of said primary log being unwound, in order to adjust said cutting position so as to cut said thin product into strips or endless strips of transverse width equal to said transverse width of said secondary support cores;
said plant management electronic center;
first graphic or electronic or magnetic supports applied to said primary logs;
second graphic or electronic or magnetic supports applied to said secondary logs;
a first device for reading and/or writing on said supports, configured to write or program said first supports, associated with said winder and operatively connected to said plant management electronic center;
a second device for reading and/or writing on said supports, associated with said rewinder and operatively connected to said management electronic center, configured to read said first supports when said primary logs are arranged on said rewinder;
a third device for reading and/or writing on supports, associated with said rewinder and operatively connected to said management electronic center, configured to program or write on said second supports present on said rewinder,
said at least one detection device for detecting product parameter, defects in said surface and/or said thickness of said thin product, winding on said winder.

15. A method for producing logs of continuous thin products in an optimized way, providing for tracking product parameters detected in log winding steps, the method comprising the steps of:
cutting a thin product into a plurality of strips;
winding said strips of a plurality of adjacent logs;
detecting, before or after cutting said thin product into said plurality of strips, parameters associated with said thin product;
storing information on said parameters in a database system, outside said logs, for at least one log of said plurality of adjacent logs;

assigning an ID code to said at least one log;
marking said at least one log with said ID code;
associating, in said database system, said information on said parameters to said ID code of said at least one log, so that information on said parameters of said corresponding log are associated, in said database, to a given ID code;
sharing, in subsequent processing steps of said at least one log, said information on said parameters stored in said database system, wherein said information on said parameters of at least one log, stored in said database system, is used in order to optimize at least one subsequent processing of said product wound into said at least one log, said use providing for recognizing said ID code of said at least one log being processed and said processing of said product of said log based on said information on said parameters of said log;
winding a master roll or primary log, and subsequently winding said master roll or primary log into said plurality of secondary logs and cutting said plurality of secondary logs into strips;
identifying a first series of said parameters associated with said thin product wound to produce said master roll or primary log;
storing, in said database system outside said master roll or primary log, information on said parameters;
assigning a primary ID code to said master roll or primary log;
marking said master roll or primary log with said primary code;
associating, in said database system, information on said parameters to said primary ID code of said master roll or primary log so that, in said database system, to a given primary ID code information are associated on said parameters of said corresponding master roll or primary log;
providing a rewinder;
cutting a common support core via said rewinder into a plurality of secondary support cores on which said product is rewound, of transverse width equal to a transverse width of said secondary logs;
unwinding said thin product via said rewinder;
cutting said thin product in a product feeding direction via said rewinder, wherein a cut position being such as to cut said product into two or more strips of transverse width equal to said transverse width of corresponding secondary support cores arranged adjacent and aligned together;
rewinding said strips, via said rewinder, on said respective secondary support cores to produce secondary logs of said thin product;
reading said primary ID code of said master roll or primary log;
acquiring said information on said parameters of said thin product in said master log or primary log, to which said primary ID code, read by said database system, is associated;
assigning secondary ID codes to respective secondary logs;
marking said secondary logs by respective secondary ID codes;
changing said information on said first series of parameters of said master log or primary log into information on said second series of parameters of each secondary log;
associating, in said database system, said secondary ID codes to said respective information on said parameters on corresponding secondary logs, such that a second series of parameters is associated with each secondary log.

16. A method according to claim 15, wherein said parameters comprise defects in a surface and/or thickness of said thin product, said information on said parameters related to said defects comprising a position of said defects on said log, said information on said position comprising coordinates of said defects on said log in terms of product meters unwound from a center of said log and distance from an edge of said log.

17. A method according to claim 15, wherein said winding of said product is performed on a support core of said respective log, said marking occurring on said support core or on said outside of said log.

18. A method according to claim 15, wherein said marking of at least one said log is a graphical, electronic or magnetic marking.

19. A method according to claim 15, further comprising, after winding said thin product into logs, rejecting, if necessary, one or more logs based on said information on said parameters associated with each log, said rejecting one or more logs comprising a step of reading said ID codes of said logs, interaction with said database system of said ID codes to access said information on said parameters of said respective logs and a decision step for deciding which logs are rejected.

20. A method according to claim 15, further comprising:
moving said at least one log from a winding area to a packing area;
reading said ID codes of said at least one log arrived to said packing area;
packing in packs formed by at least one log;
creating, in a database system, an association formed by secondary codes of said logs forming each pack.

* * * * *